United States Patent [19]

Okamoto et al.

[11] Patent Number: 4,484,938
[45] Date of Patent: * Nov. 27, 1984

[54] TOTAL HEAT EXCHANGER

[75] Inventors: Kunio Okamoto; Akira Fukami, both of Okazaki, Japan

[73] Assignee: Nippon Soken, Inc., Nishio, Japan

[*] Notice: The portion of the term of this patent subsequent to Mar. 22, 2000 has been disclaimed.

[21] Appl. No.: 458,462

[22] Filed: Jan. 17, 1983

[30] Foreign Application Priority Data

Jan. 28, 1982 [JP] Japan .................................. 57-10857

[51] Int. Cl.³ ............................................ B01D 53/04
[52] U.S. Cl. ...................................... 55/269; 55/278; 55/387; 55/388
[58] Field of Search ................. 55/269, 316, 278, 387, 55/388, 524; 162/128, 129, 152; 428/408, 537, 184, 186

[56] References Cited

U.S. PATENT DOCUMENTS

| | | | |
|---|---|---|---|
| 2,593,146 | 4/1952 | Leigh | 162/128 |
| 2,979,157 | 4/1961 | Clark | 55/387 |
| 3,015,367 | 1/1962 | Smith et al. | 55/387 |
| 3,091,550 | 5/1963 | Doying | 55/387 |
| 4,154,883 | 5/1979 | Elias | 162/129 |
| 4,377,400 | 3/1983 | Okamoto et al. | 55/269 |

FOREIGN PATENT DOCUMENTS

| | | | |
|---|---|---|---|
| 3034718 | 4/1981 | Fed. Rep. of Germany | 428/537 |
| 13528 | 2/1979 | Japan | 428/537 |
| 134107 | 10/1979 | Japan | 162/128 |
| 136570 | 10/1979 | Japan | 55/388 |
| 119418 | 9/1980 | Japan | 55/387 |
| 119421 | 9/1980 | Japan | 55/387 |
| 121330 | 9/1980 | Japan | 55/387 |
| 594229 | 2/1978 | U.S.S.R. | 162/128 |

*Primary Examiner*—David Lacey
*Attorney, Agent, or Firm*—Cushman, Darby & Cushman

[57] ABSTRACT

A total heat exchanger for exchanging both heat and humidity is made, using partition plates of a laminate of a carbon-fiber-based paperlike material and a hydrophilic material, resulting in improving the humidity exchange ability while both the permeability and the heat conductivity are high.

10 Claims, 4 Drawing Figures

TOTAL HEAT EXCHANGER

BACKGROUND OF THE INVENTION

1. Field of the Invention

The present invention relates to a heat exchanger, more particularly to a total heat exchanger for exchanging sensible and latent heat between gas flows of different temperatures and humidities.

2. Description of the Prior Art

Heat exchangers are often used along with ventilation of air in a room or a vehicle. They exchange heat between the air discharged therefrom and introduced therein to recover the heat. Such heat exchangers must exchange both the sensible heat and latent heat of the air. This is referred to as "total heat exchange".

Well known conventional heat exchangers have a multi-layer structure formed by a plurality of spaced flat metal plates (partition plates) arranged in parallel to each other, for alternatively defining first and second gas flows, and a plurality of corrugated metal sheet members (spacer members) inserted between the partition plates, for maintaining the spaces between the partition plates. This type of metal heat exchanger can exchange only sensible heat, resulting in low efficiency heat exchange when there is a large amount of latent heat. That is to say, it cannot effectively conduct total heat exchange.

A known technique to solve this problem is to make the partition plates of material having a relatively low heat conductivity, such as asbestos, impregnated with a hydroscopic agent, such as lithium chloride, to recover the latent heat of the air. This type of partition plate, however, is low in permeability (defined here as the resistance of a material, such as a paper, to the permeation of a gas or liquid), and, therefore, polluted air flowing out of a room is returned again through the partition plate into the room.

It is also known to use Japanese paper, which is permeable to water vapor, for partition plates in a heat exchanger (see Japanese Examined Utility Model Publication (Kokoku) No. 50-22365). Japanese paper, however, is not that good in heat conductivity and water vapor permeability and it increases the size of a heat exchanger.

BRIEF SUMMARY OF INVENTION

It is, therefore, an object of the present invention to provide a heat exchanger which has partition plates of increased permeability and which can excellently exchange both sensible and latent heat, i.e., heat and humidity.

These and other objects, features, and advantages of the invention are accomplished by a total heat exchanger for exchanging sensible and latent heats between gas flows having different temperatures and humidities, the total heat exchanger comprising a plurality of spaced partition plates arranged in parallel to each other, for alternatively defining first and second gas passages, the partition plates being a laminate of a carbon-fiber-based paperlike material and a hydrophilic material.

BRIEF DESCRIPTION OF THE DRAWINGS

The present invention will now be described in detail with reference to the accompanying drawings, in which.

DETAILED DESCRIPTION OF THE INVENTION

Figure 1:
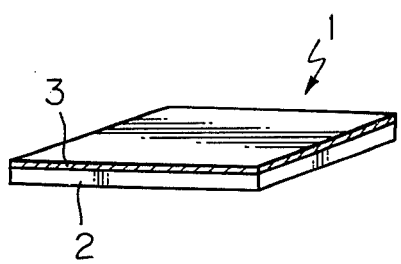
FIG. 1 is a perspective view of a partition plate used in a total heat exchanger according to the present invention.

In general, increasing the permeability of the partition plates decreases the efficiency of the humidity exchange. However, both increased permeability and increased efficiency of humidity exchange are obtained by the total heat exchanger according to the present invention. This is because a total heat exchanger according to the present invention uses as partition plates a laminate composed of a carbon-fiber-based paperlike material, which can absorb a large amount of water vapor and has high rates of absorbing and releasing water vapor, and a hydrophilic material, which can absorb a large amount of water vapor and has a low rate of releasing water vapor and a high permeability. Almost none of the water absorbed on the hydrophilic material side of the partition plate is released. It moves through the carbon-fiber-based paperlike layer by repeated absorption and release thereof to be released into the passage on the side of the carbon-fiber-based paperlike material. This phenomenon is preferably caused by facing the hydrophilic material to the first gas flow and the carbon-fiber-based paperlike material to the second gas flow, the first gas flow containing higher humidity than the second gas flow.

The carbon-fiber-based paperlike material also has higher heat conductivity than conventional pulp or asbestos, thus providing a heat exchanger even more excellent in heat exchange efficiency.

The carbon-fiber-based paperlike material used in the total heat exchanger according to the present invention may be made by forming a sheet on a fine wire screen from a water suspension of carbon fiber and binder material. The carbon fiber may be normal carbon fiber or, preferably, activated carbon fiber. The carbon fiber is activated by, e.g., treatment with an active vapor such as water vapor, carbon dioxide, oxygen, or a mixture thereof, so as to increase the surface area of the fiber, thereby enhancing its ability to exchange humidity. The carbon fiber may generally have a diameter less than about 30 $\mu$m (micrometer) and a length of from about 1 mm to about 30 mm, preferably a diameter less than 15 $\mu$m and a length of from 3 mm to about 10 mm.

Generally speaking, a paperlike material cannot be made just from carbon fiber. It is, therefore, usually made by mixing carbon fiber with a binder material in an amount of about 3% to 25% by weight, preferably 8% to 25% by weight, of the total weight of the paperlike material. The binder material may be polyvinyl alcohol fiber or another material which becomes adhesive by treatment with water, or nylon fiber, ethylene-vinyl acetate fiber, polypropylene, or another material which becomes adhesive when heated, i.e., a hot melt fiber. In the paperlike material, reinforcing fiber, for example, rayon, polypropylene, nylon, acrylic, or other fibers may be incorporated.

In a preferred embodiment of the present invention, the carbon-fiber-based paperlike material further comprises pulp fiber in the range of about 0% to 80% by weight, preferably 10% to 50% by weight, of the paperlike material. The raw material of the pulp may be softwood, hardwood, cotton, and so on. While this pulp fiber functions as a binder material for the carbon fiber, its incorporation into the paperlike material more significantly facilitates the later lamination of the hydrophilic material and performs part of the function of the hydrophilic material itself. These further improve the effectiveness of the total heat exchanger of the present invention. However, even when binder material and pulp fiber are incorporated into a carbon-fiber-based paperlike material, the amount of carbon fiber must not be less than approximately 20% by weight of the paperlike material.

The hydrophilic material may be a paperlike material of e.g., pulp of softwood, hardwood, and/or cotton or a film made of, e.g., polyvinyl alcohol or methylcellulose.

The partition plate made of a carbon-fiber-based paperlike material and a hydrophilic material used in a total heat exchanger of the present invention preferably is thin, and more preferably, is of a thickness of 0.3 mm or less. The thickness of the carbon-fiber-based paperlike material is preferably greater than or at least equal to that of the hydrophilic material. While the hydrophilic material is also preferably thin, a thickness of about 0.02 to 0.05 mm is convenient since it is currently technically difficult to produce a thickness less than about 0.01 to 0.02 mm.

The partition plate used in a total heat exchanger of the present invention may be produced by simply combining by adhesion previously produced sheets of carbon-fiber-based paperlike material and of hydrophilic material, but is preferably made by making a paperlike sheet of carbon-fiber-based material, followed by a paperlike sheet of hydrophilic material onto the premade carbon-fiber-based paperlike sheet as a support. The permeability, as measured by Japan Industrial Standard (JIS) P-8117, is preferably more than 100 seconds. Such a preferred permeability may be obtained by beating the raw material for the hydrophilic paperlike material before making a sheet with it, to adjust the freeness thereof to, for example, less than 500 ml, more preferably, less than 400 ml, under the Canadian standard freeness test.

In another preferred embodiment of the present invention, the partition plate is impregnated with lithium chloride and/or calcium chloride. These impregnated materials themselves can function to absorb and release water vapor. Therefore, the above impregnation treatment accelerates the action of the partition plates of the total heat exchanger of the present invention.

Activated carbon-fiber-based paper may also be used for the space members.

In the total heat exchanger of the present invention, the directions of the gas flows are not limited. They may be counterflows, parallel flows, cross flows, or modifications or combinations thereof.

In accordance with the total heat exchanger of the present invention, polluted air in a room is not returned into the room through the partition plate of the exchanger. Also, not only heat, but also humidity can be fully exchanged during the heat exchange process between the two gas flows.

EXAMPLES

Example 1

An activated carbon-fiber-based paper having a size of 25 cm×50 cm and a thickness of 0.15 mm was produced by a paper-making process, weight 40 g/m², from a mixture of 60% by weight of activated carbon fiber, activated by treatment with combustion gas containing water vapor (a product of Toyobo Co. Ltd., identified as C-1500 of 2 denier and cut to lengths of 10 mm), 20% by weight of polyvinyl alcohol fiber (a product of Unitika Ltd. known as Vinylon, of 1 denier and cut to lengths of 3 mm), and 20% by weight of pulp (hardwood) fiber treated to a freeness of 560 ml. Then 90% by weight of pulp (hardwood) fiber having a freeness of 350 ml and 10% by weight of the polyvinyl alcohol fiber were mixed and laminated onto the activated-carbon-fiber-based paper as described above in a thickness of about 0.18 mm.

FIG. 1 shows a partition plate 1 made in the manner described above. The partition plate 1 comprises a layer of activated-carbon-fiber-based paper 2 and a layer of hydrophilic material 3 laminated onto the layer 2.

Figure 2:
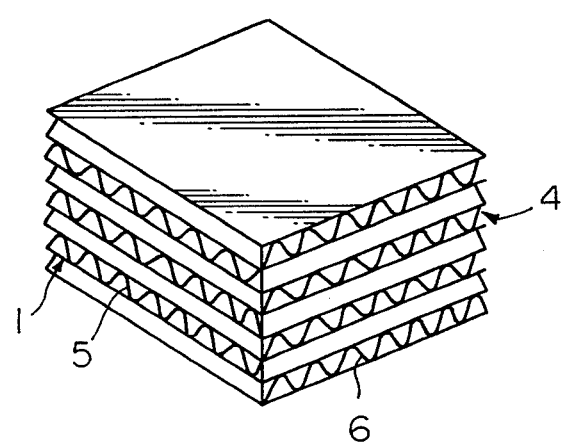
FIG. 2 is a perspective view of a total heat exchanger according to the present invention.

Referring now to FIG. 2, a heat exchanger A was fabricated by arranging a plurality of flat partition plates 1 parallel to each other with a corrugated spacer member 4 made of pulp paper inserted therebetween at alternating right angles, illustrated in the figure as 5 and 6. The result was a multilayer structure. Thus, two gas passages arranged in perpendicular directions were formed between the flat partition plates 1, i.e., through the spacer member arranged in the direction of spacer 6. The distances between the flat partition plates 1 were about 2.5 mm.

The heat exchanger A was then tested with high humidity air flow directed through the passages on the side of the hydrophilic material 3 of the flat partition places 1. The heat exchange efficiency $\eta_T$ and the humidity exchange efficiency $\eta_H$ were determined by the following formula:

$$\eta_T = \frac{1}{2}\left(\frac{T_h - T_1}{T_h - T_c} + \frac{T_c - T_2}{T_c - T_h}\right),$$

$$\eta_H = \frac{1}{2}\left(\frac{H_h - H_1}{H_h - H_c} + \frac{H_c - H_2}{H_c - H_h}\right),$$

where $T_h$ and $H_h$, respectively, are the temperature and humidity of the high temperature, high humidity air flowing onto the exchanger;

$T_c$ and $H_c$, respectively, are the temperature and the humidity of the low temperature, low humidity air flowing into the exchanger;

$T_1$ and $H_1$, respectively, are the temperature and the humidity of the high temperature, high humidity air flowing out of the exchanger; and $T_2$ and $H_2$, respectively, are the temperature and the humidity of the low temperature, low humidity air flowing out of the exchanger. In the test, $T_h$-35° C., $H_h$=24 g/m³;

$T_c$-23° C., $H_c$=11 g/m³;

and the flow rate of the two air flows into the exchanger was 70 m³/hr.

Example 2 (Comparative)

A heat exchanger B was fabricated and tested in the same way as in Example 1, except the air flow is reversed, i.e., the lower humidity air was forced to flow in contact with the hydrophilic material 3 side of the partition plates 1.

Example 3

A heat exchanger C was fabricated and tested in the same way as in Example 1, except that the flat partition plates 1 were produced only with activated-carbon-fiber-based paper 2 and without the hydrophilic material 3.

Example 4

A heat exchanger D was fabricated and tested in the same way as in Example 1, except that various pulp-fiber-based papers having different permeabilities (measured under JIS.P.8117) were used as the flat partition plates 1.

Example 5

A heat exchanger A' was fabricated and tested in the same way as in Example 1, except that the flat partition plates 1 were impregnated with a 3% aqueous lithium chloride solution.

Example 6

A heat exchanger A" was fabricated and tested in the same way as in Example 1, except a polyvinyl alcohol film was used in place of the pulp-fiber-based paper.

Figure 3:
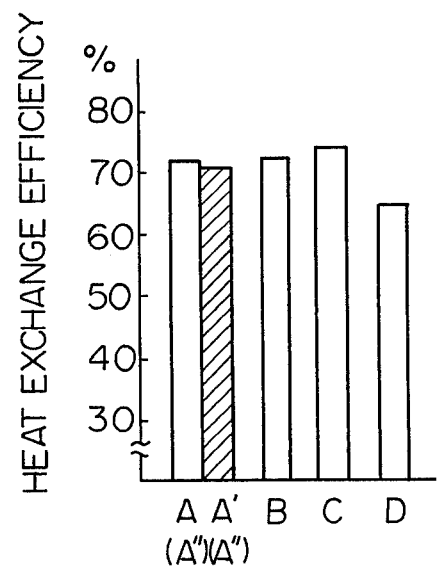
FIG. 3 is a histogram of the heat exchange efficiency of various heat exchangers.

The heat exchange efficiencies of heat exchangers A, A', A", B, C, and D, are shown in FIG. 3. As can be seen from FIG. 3, heat exchange efficiency increased when activated carbon fiber was incorporated into the partition plates, in comparison to those samples in which the partition plates were based only on pulp fiber. The impregnation of lithium chloride only slightly changed the heat exchange efficiency.

Figure 4:
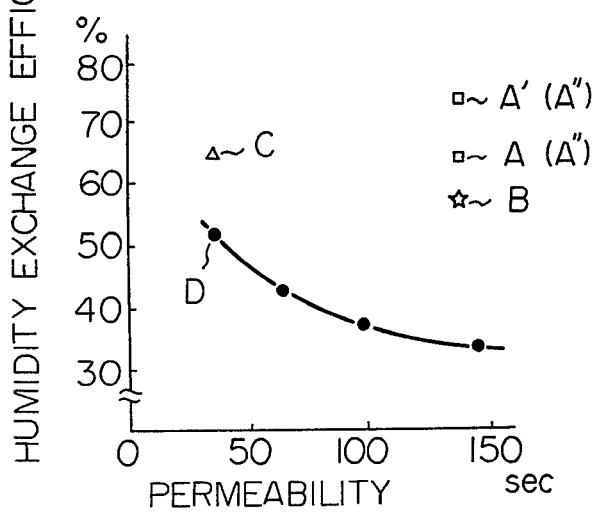
FIG. 4 is a graph of the humidity exchange efficiency of various heat exchangers.

FIG. 4 shows the relationship of the humidity exchange efficiencies and the permeabilities of the heat exchangers A, A', A", B, C, and D. As shown in FIG. 4, in the case of heat exchanger D, in which the partition plates were based only on pulp fiber, the higher the permeability the lower the humidity exchange efficiency. However, in the case of heat exchanger A, in which the partition plates were a laminate of a carbon-fiber-based paper and a pulp-fiber-based paper and the higher humidity air flow was forced to flow in contact with the pulp-fiber-based paper, the permeability was four times that of the heat exchanger C, in which the partition plates were only an activated-carbon-fiber-based paper; the humidity exchange efficiency of the heat exchanger A was not different from the heat exchanger C. Furthermore, the humidity exchange efficiency was increased by impregnation of lithium chloride (see heat exchanger A'). Heat exchanger A" showed results similar to those of heat exchangers A and A'.

We claim:

1. A total heat exchanger for exchanging sensible and latent heat between first and second gas flows having different temperatures and humidities, said total heat exchanger comprising a plurality of flat partition plates capable of exchanging both sensible and latent heat between two gas flows passed along both sides of each of the partition plates, support members spacing and supporting said partition plates in parallel to each other and cooperating with said partition plates to define two series of passages for first and second gas flows, wherein said partition plates are a laminate of a carbon-fiber-based paperlike material and a hydrophilic material, the carbon-fiber-based paper like material containing no less than about 20% by weight of carbon fiber, based on the total weight of the carbon-fiber-based paper like material.

2. A total heat exchanger according to claim 1, wherein said hydrophilic material is paperlike in structure.

3. A total heat exchanger according to claim 1, wherein said hydrophilic material is in the form of a film.

4. A total heat exchanger according to claim 1, wherein said support members are composed of a plurality of corrugated spacer members inserted between said partition plates, said spacer members supporting and spacing said partition plates by placing the ridges of the corrugations thereof in contact with adjacent partition plates, and cooperating with said partition plates to define said two series of passages for said first and second gas flows, the directions of said two series of passages being defined by the directions of the ridges of said corrugated spacer members.

5. A total heat exchanger according to claim 1, wherein said carbon-fiber-based paperlike material is made from carbon fiber and fibrous binder material.

6. A total heat exchanger according to claim 5, wherein pulp fiber is further incorporated in said carbon-fiber-based paperlike material.

7. A total heat exchanger according to claim 1, wherein said carbon fiber is activated carbon fiber.

8. A total heat exchanger according to claim 1, wherein said partition plates are impregnated with lithium chloride.

9. A total heat exchanger according to claim 1, wherein said partition plates are impregnated with calcium chloride.

10. A total heat exchanger according to claim 1, wherein said partition plates are impregnated with lithium chloride and calcium chloride.

* * * * *